United States Patent [19]

Barry et al.

[11] Patent Number: 5,745,657
[45] Date of Patent: Apr. 28, 1998

[54] METHOD AND APPARATUS FOR MULTI-MODAL PRINTING WITH ELECTROPHOTOGRAPHIC PRINT ENGINE

[75] Inventors: Michael W. Barry; Jack N. Bartholmae, both of Duluth; E. Neal Tompkins, Atlanta, all of Ga.

[73] Assignee: T/R Systems, Norcross, Ga.

[21] Appl. No.: 263,567

[22] Filed: Jun. 22, 1994

[51] Int. Cl.$^6$ ........................................... G06F 9/36
[52] U.S. Cl. ................................. 395/102; 395/114
[58] Field of Search ............................ 395/102, 114, 395/117, 115, 110, 101, 111, 112, 326, 109; 358/445

[56] References Cited

U.S. PATENT DOCUMENTS

| | | | |
|---|---|---|---|
| 4,504,868 | 3/1985 | Hasuike et al. | 358/280 |
| 5,157,482 | 10/1992 | Cosgrove | 358/54 |
| 5,182,652 | 1/1993 | Stephenson, III | 358/296 |
| 5,270,728 | 12/1993 | Lund et al. | 346/1.1 |
| 5,270,836 | 12/1993 | Kang | 358/459 |
| 5,293,254 | 3/1994 | Eschbach | 358/445 |
| 5,387,985 | 2/1995 | Loce et al. | 358/447 |
| 5,469,198 | 11/1995 | Kadonaga | 347/41 |

FOREIGN PATENT DOCUMENTS

| | | |
|---|---|---|
| 0 262 801 A2 | 8/1987 | European Pat. Off. . |
| 0 342 853 A1 | 5/1989 | European Pat. Off. . |
| 2 102 240 | 6/1982 | United Kingdom . |
| 2 123 647 | 7/1983 | United Kingdom . |

Primary Examiner—Raymond J. Bayerl
Assistant Examiner—Steven P. Sax
Attorney, Agent, or Firm—Gregory M. Howison

[57] ABSTRACT

A mapping system is provided for mapping a first contone image and a second bi-level higher resolution image to an output image space for an electrophotographic marking engine, utilized as a printer. A bi-modal hardware device (22) is provided for receiving the information for the two images and then mapping it to the output image space in the marking engine (10). The pixel data associated with the high resolution image is stored in a FIFO (164) and then count values stored in a FIFO (158) associated with the portion of the line in the output image space that is associated with the high resolution image. The pixel data for the portion of the line associated with the low resolution image is stored in a FIFO (182) with a corresponding count value stored in a FIFO (178). A counter is then operable to determine how many pixels of the high resolution image are to be mapped in the output image space. A multiplexer (174) is controlled to select between the high resolution image and the low resolution image for output to the marking engine (10). Counter and control logic blocks (160) and (180) are operable to control the operations of the high resolution image and the low resolution image portions, respectively. Therefore, only the information required to be transferred to the printer for that portion of the high resolution or low resolution image associated with the output image space need be transferred to the printer, thus increasing throughput and decreasing memory requirements. Further, two different resolutions can be accommodated.

14 Claims, 14 Drawing Sheets

METHOD AND APPARATUS FOR MULTI-MODAL PRINTING WITH ELECTROPHOTOGRAPHIC PRINT ENGINE

TECHNICAL FIELD OF THE INVENTION

The present invention pertains in general to electrophotographic print engines and, more particularly, to a printer application wherein different images are mapped into the output image plane, both images allowed to have different resolutions.

BACKGROUND OF THE INVENTION

Electrophotographic printing engines are utilized in one of two applications, either as a copier or as a printer. In a copier application, a latent image is typically formed and then transferred onto an image carrier, such as paper. In order to create this image, it is only necessary to create a line at a time and transfer it to a photoconductor belt or drum and then create the next line, as an original document is scanned. However, a printer operates differently in that it is driven by a computer wherein an image is created and then downloaded to the printer, which printer is then operable to generate the necessary driving signals to drive the output device, such as a laser. The main difference between a printer and a copier with respect to this operation is the amount of memory required.

For a printer application, it is necessary to store all the information associated with the image in memory within the printer, such that the data associated with the image is generated by the computer, transferred via some type of bus to the printer and stored in memory at the printer. Images are typically created in the form of pixels or picture elements, which pixels are represented in a digital format. In a bi-level pixel format, the pixel is either "on" or "off." Therefore, only a single bit is required for each pixel. However, when a color printer application is utilized, wherein three colors, for example, are utilized, then each pixel in a bi-level system will require at least three bits of information, with a possible additional bit of information inquired if a black level is provided. By comparison, a continuous tone (contone) format will provide 255 levels, typically referred to as "Grey-Levels" for each pixel, such that each pixel requires an eight bit word for representation thereof. In a multi-color system this will require three eight-bit words, or 24 bits or pixels to represent a color pixel. It can therefore be seen that a Contone color image for an 8½×11 sheet of paper can require as much as 100 megabytes of storage space.

To minimize the amount of information required, the resolution of the image can be varied. For example, most Contone images are generated at resolutions of 100 pixels per inch, which is sometimes referred to as "dots per inch" (DPI). They can be at lower resolutions such as 75 DPI or 150 DPI. It should be understood that "dot" in this context refers to the pixel. The reason for this is that pixels of this size provide enough information to the human eye to generate a relatively high resolution pixel picture using a Contone image technique. However, when text is utilized, this typically requires sharp edges for the various lines, especially for slanting lines. For example, the letter "A" has slanting sides that, when printed at low resolution, will result in a stair-step effect on the lines if not somehow accounted for. By going to a high resolution print format such as 600 DPI, the visual perception of this stair-step effect can be minimized if not eliminated, as the human eye cannot distinguish a stair step at 600 DPI. However, a stair step at 75 DPI or 150 DPI can be distinguished in text.

Whenever a Contone text image is reproduced, the system must operate in a single resolution. Therefore, the text will be reproduced at 600 DPI or 300 DPI and the Contone image will be reproduced at the same resolution. This is a disadvantage in that a larger number of pixels are required for the Contone image at the higher resolution than are required for visual perception, with each pixel requiring eight bits per color or, for a three color system, 24 bits of information for each pixel. This is a significant increase in the amount of information required to render an image visually perceptive from the minimal resolution of 75 DPI required. This is required primarily to insure that text be at a high resolution. Further, another disadvantage is that whenever the text overlays the Contone image, the amount of information on a sheet that is required to be input to the printer has increased. This creates a significant problem in that the memory requirements and the throughput to the printer are increased.

SUMMARY OF THE INVENTION

The present invention disclosed and claimed herein comprises a system for mapping images to an output image space in a marking engine. The system includes a first mapping system for mapping a first portion of a first input image space having a first pixel format and a first resolution into a first portion of the output image space. A second mapping system is provided for mapping a second portion of a second input image space having a second pixel format and a second resolution into a second portion of the output image space. The first and second portions of the first and second images, respectively, at least partially overlapping in the output image space. The overlapping portions of the first image space are disposed above the corresponding overlapping portion of the first image space in the output image space.

In another aspect of the present invention, the first resolution is higher than the second resolution and the edge of the overlapping portion of the first image space that is adjacent to the overlapping portion of the second image space in the output image space is defined by the first resolution.

In a further aspect of the present invention, the first and second image spaces are defined by first and second pixel data, respectively. The first and second pixel data is generated by a Central Processing Unit (CPU) and stored in a CPU memory. The first mapping system is operable to only transmit from the CPU memory to the output image space the first pixel data associated with the first portion of the first image space. The second mapping system is operable to only transmit from the CPU memory to the output image space the second pixel data associated only with the non-overlapping portion of the second portion of the second image space.

In yet another aspect of the present invention, the first and second mapping systems include a first pixel fragmenter and a second pixel fragmenter. The first pixel fragmenter is operable to select from the CPU memory the first pixel data constituting the first portion of the first image space. The second pixel fragmenter is operable to select from the CPU memory the second pixel data constituting the non-overlapping portion of the second portion of the second image space. An assembler is provided for assembling the output image space with the selected ones of the first and second pixels selected by the first and second pixel fragmenters, respectively.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
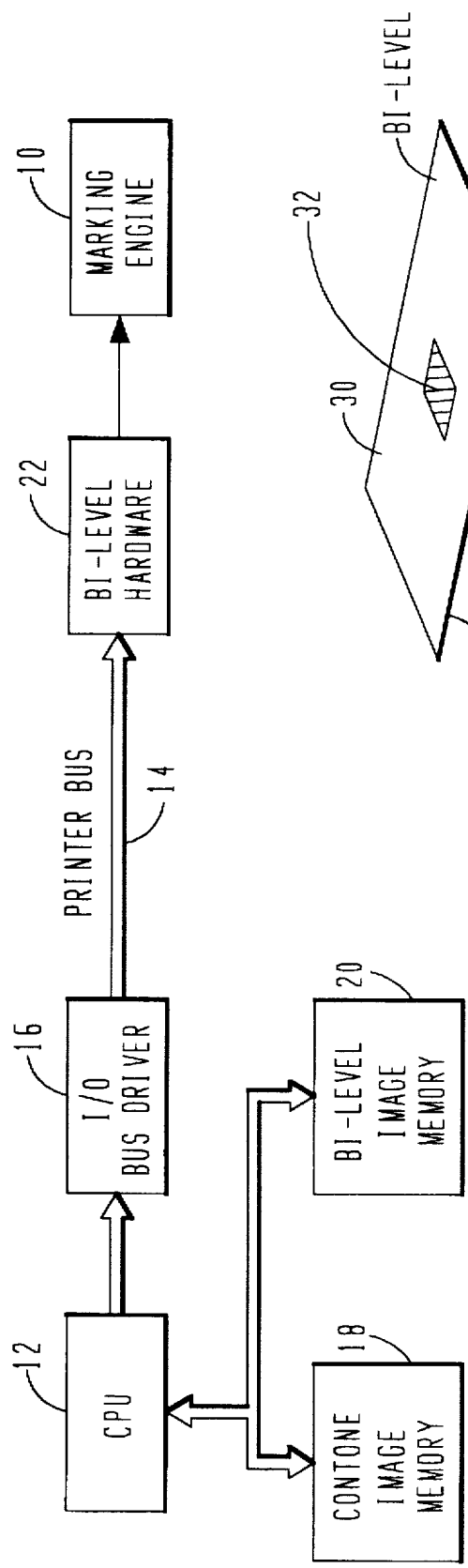
FIG. 1 illustrates an overall block diagram of the system.

Referring now to FIG. 1, there is illustrated an overall block diagram of the present bi-modal system. In general, a marking engine 10 is provided which is operable to receive an image carrier, such as a sheet of paper, and "mark" it in accordance with a predetermined image pattern. The marking engine 10 is a conventional electrophotographic print engine in the present embodiment. This is a laser driven engine which is operable to receive an input signal that controls the laser to generate a "dot" on an electrophotographic belt or drum which is then developed such that toner of a select color adheres to the dot and then the dot is transferred to the image carrier. Thereafter, the image carrier is subjected to a fusing operation and the toner is exposed to heat in a fuser mechanism to "fix" the toner onto the image carrier. Again, this is a conventional operation and it should be understood that any type of marking engine could be utilized.

A CPU 12 is provided which is operable to control the system and generate images for transfer to the marking engine 10. The CPU 12 conventionally interfaces with a printer bus 14 with an input/output (I/O) bus driver 16. This can be a conventional I/O interface or it can be a custom interface. In accordance with the present invention, two types of images are accommodated, a continuous tone (Contone) image and a bi-level image. The Contone image is comprised of a plurality of pixels, each pixel consisting of an eight bit word. Each eight bit word will represent 255 levels. By comparison, the bi-level image only has a single bit. However, for multiple colors, each color of a Contone image will have one byte of data, wherein each color of the bi-level image will have one bit. The data for the Contone image is stored in a Contone image memory 18 and the data for the bi-level image is stored in a bi-level image memory 20. In actuality, both the Contone image memory and bi-level image memory 20 are realized in the same mass storage device. However, for illustrative purposes, two memories are provided to show that there are two separate images that are to be mapped into the output image base that is presented to the marking engine 10. This will be described in more detail hereinbelow.

When the final composite image in the output image space is formed from the images in the memories 18 or 20, the images are combined partly in software and partly in hardware. The hardware that is utilized to generate the output image in the output image space is a bi-modal hardware device 22. The bi-modal hardware device 22 is operable to receive instructions from the CPU 12 over the printer bus 14, which instructions are comprised of count values and data, wherein the bi-modal hardware 22 is operable to utilize the count value and data to assemble an image in the output image space. This will be described in more detail hereinbelow.

Figure 2:
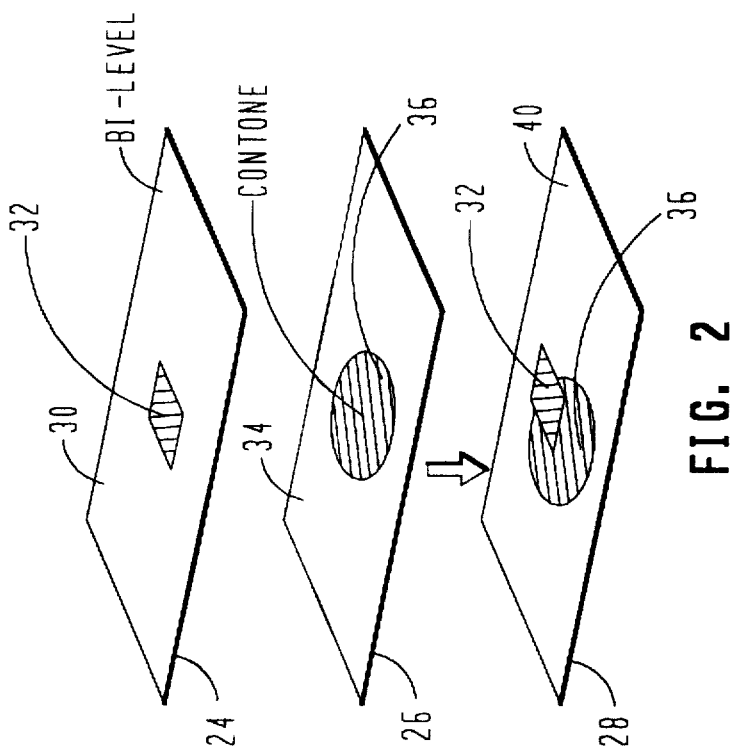
FIG. 2 illustrates a diagrammatic view of the various levels in the output image space.

Referring now to FIG. 2, there is illustrated a diagrammatic view of the assembly of the two images into the output image space. A first image space 24 is provided which has the bi-level image contained therein. A second image space 26 is provided for containing the Contone image. Although the present description utilizes a bi-level space and a Contone image space, it should be understood that the present invention is directly toward combining two different image spaces, which images therein may have a different format and/or resolution. These two images in their respective image spaces are combined to form an output image in an output image space 28.

The image space 24 is comprised of a background 30 and foreground image 32. Similarly, the image space 26 is comprised of a background 34 and a foreground image 36. The output image space 28 is assembled such that the foreground image 32 appears on top of foreground image 36. With respect to the output image space, there is an output image space background 40, which output image space background 40 is comprised of the portion of the background image 30 that is not covered by the foreground image 32, or would not be within the bounds of the foreground image 36. However, the background image space 40 could have been made up by pixels that comprise the background image space 34.

In the preferred embodiment, the bi-level image in the image space 24 is a high resolution image, whereas the image in the image space 26 is a low resolution image. As such, the low resolution image space 26 will have significantly less pixels than the image in the image space 24, which image is a high resolution image. Therefore, in the preferred embodiment, the output image space 20 accommodates two different resolution images. As will be described hereinbelow, only the data associated with the portion of the image space 26 that is disposed in the output image space 28 will be transferred to the bi-modal hardware 22 and similarly, only the portion of the image space 24 that comprises the output image space 28 will be transferred to the bimodal hardware 22. This significantly reduces the amount of information that is required to be transferred to the printer over the printer bus 14.

Figure 3:
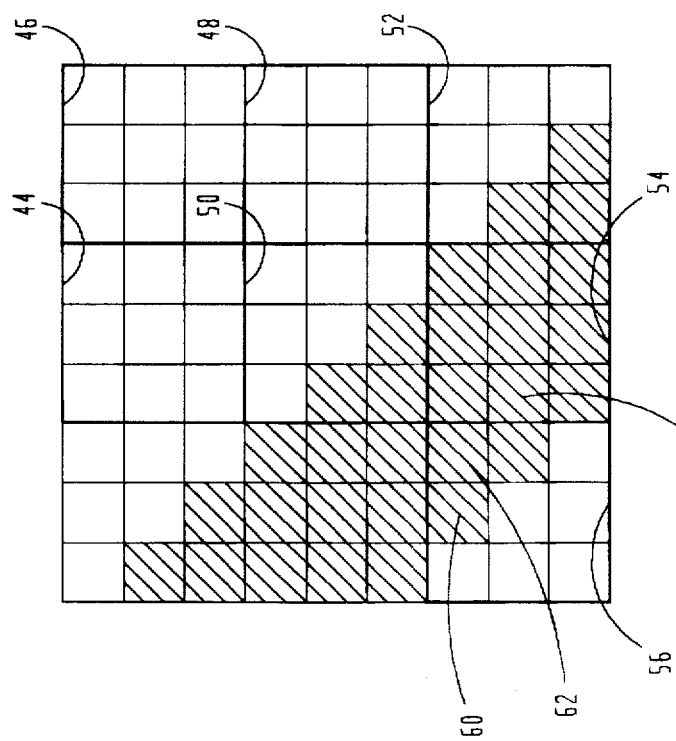
FIG. 3 illustrates a two-dimensional view of the output image space.

Referring now to FIG. 3, there is illustrated a diagrammatic view of the output image space which is represented by a grid of high resolution pixels, the low resolution pixels comprising a 3×3 block of high resolution pixels. In the mapping function, the high resolution image in the image space 24, comprising the foreground image 32, is represented by a plurality of shaded areas, wherein the portion of the foreground image formed as a Contone image is represented by the heavily bordered 3×3 blocks of the high resolution pixel grid. There are seven low resolution pixels 44, 46, 48, 50, 52, 54 and 56. It can be seen that the low resolution pixel 54 is entirely masked by the high resolution pixels in the foreground image 32. As will be described hereinbelow, the information in this pixel is not transmitted to the bi-polar hardware 22. This pixel 54 merely represents a potential pixel in the original image space 26 of the Contone image. It can also be seen that the low resolution pixel 56 has three high resolution pixels 60, 62 and 64 disposed partially within the area that defines the pixel 56. This is the technique by which "an edge" of high resolution image can be defined within the image space of the low resolution Contone image. This also occurs in the low resolution pixel 50 and the low resolution pixel 52. Further, it can be seen that the background outside of the image space defined by the low resolution pixels 46–56 is comprised of the high resolution background pixels.

Figure 4:
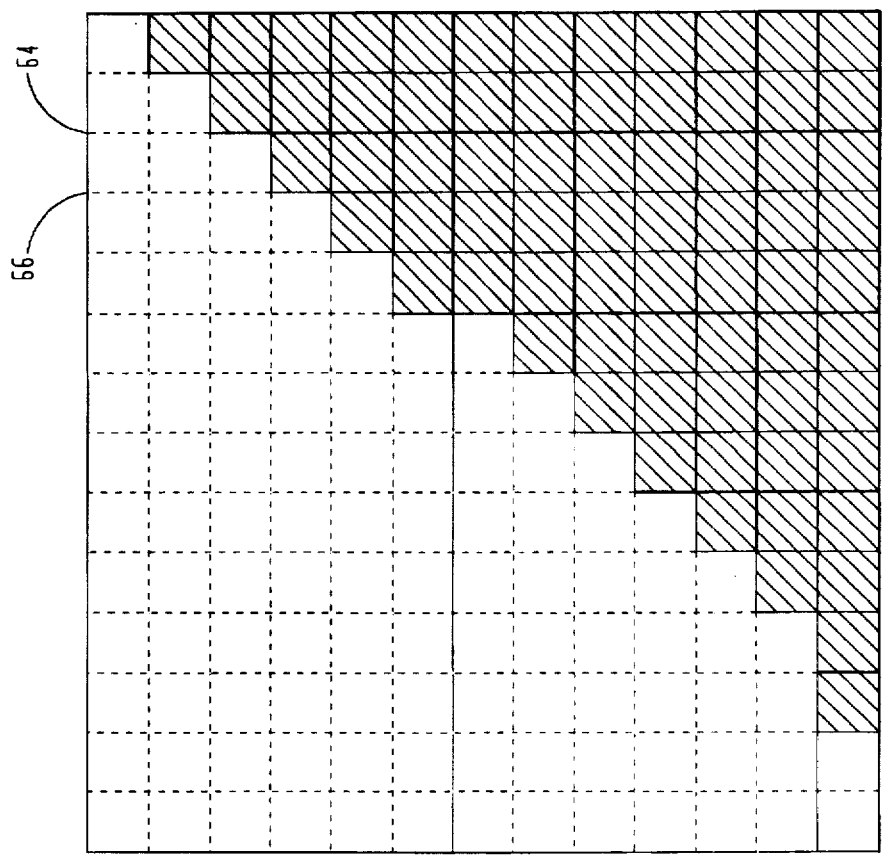
FIG. 4 illustrates a detailed example of the output image space.

Referring now to FIG. 4, there is illustrated an example of how the image is actually constructed in the bi-modal hardware 22. In the example of FIG. 4, a page is provided that is 14 (600 DPI) pixels wide and 13 (600 DPI) lines in length. As such, each line will accommodate 14 high resolution (600 DPI) pixels or 4⅔ low resolution (200 DPI) pixels. Vertically, the page provides for 13 high resolution (600 DPI) pixels in each column and 4⅓ low resolution (200 DPI) pixels. Each low resolution pixel therefor occupies a space of nine high resolution pixels. Since the marking engine will accommodate the 600 DPI high resolution pixels, it should be understood that the technique utilizes a line replication algorithm wherein three passes are required to generate each pixel, i.e., the first line of a low resolution (200 DPI) pixel is generated the same way as the next two lines on two subsequent passes of the laser.

The data is fed to the laser in a serial manner such that the information for each pixel will determine the modulation signal to the laser itself For example, if a single dot were to be generated for a high resolution pixel, the laser would be activated as the pixel was scanned by the laser, such that the higher energy existing at the center of the pixel provides a "dot". In some systems, the actual width of this dot can be modulated for various effects. If a plurality of "1s" were stored representing a plurality of sequential dots, i.e., the black area, then each time the laser passed the center of the pixel it would rise to a high level and then to a low level. By contrast, a low resolution Contone pixel utilizes a modulation technique wherein the amount of time the laser is turned on from the beginning of the pixel to the end of the pixel is a function of the value of the pixel. Since there are 256 levels from 0 to 255, the amount of time the laser is turned on for the entire length of the pixel in a given line is a function of that value. A small value will result in the laser being turned on for a short duration and a high value will result in the laser being turned on for a longer duration of time. Therefore, as will be described hereinbelow, it is a combination of the high resolution pixel and the low resolution Pulse Width Modulation (PWM) techniques that allows the high resolution edge to overlay the low resolution image.

The image illustrated in the diagram of FIG. 4 is comprised of a high resolution image on the left illustrated in "white" and a low resolution image located on the right in "grey". The information for each of the pixels in "white" can be either a 1 or a 0, it being understood that this is merely representative of the image space of the high resolution pixels. The grey area merely represents the image space of the low resolution pixel that is to show through the high resolution image. Therefore, the data associated with the high resolution image will show up in each of the white pixels and data associated with the low resolution pixels will show up in each of the grey pixels.

To feed the data for the various pixels to the system, a counter is provided which basically determines when pixels should be output. For example, in a high resolution image, there are "background" pixels associated with the image that would normally lie in the image space occupied by the low resolution pixels in the grey image. Similarly, the portion of the low resolution image that would underlie the high resolution image would also have information associated therewith. The present invention does not store this data or transfer this data to the printer. Only the information associated with the pixels that are to be generated in the output image are stored and then the counter utilized to output these images. Therefore, there are two counters that are provided, a 600 DPI counter and a 200 DPI counter. The sequence of each of these counters is illustrated in Table 1.

TABLE 1

| 600 DPI Counter | 200 DPI Counter |
| --- | --- |
| 27 on | 4 off |
| 1 off | 1 on |
| 12 on | |
| 2 off | 3 off |
| 11 on | 2 on |
| 3 off | |
| 10 on | 2 off |
| 4 off | 3 on |
| 9 on | |
| 5 off | 1 off |
| 9 on | 4 on |
| 5 off | |
| 8 on | 5 on |
| 6 off | |
| 7 on | |
| 7 off | |
| 6 on | |
| 8 off | |
| 5 on | |
| 9 off | |
| 4 on | |
| 10 off | |
| 2 on | |
| 12 off | |

Initially, the 600 DPI counter is on and the 200 DPI counter is off. The high resolution image occupies the entire first line such that the high resolution counter must be on for that entire line. At the end of that line, the laser wraps around and starts the next line, such that the high resolution counter must continue to be on. This occurs for 27 counts. At the end of the second line, the last pixel in that line is associated with the low resolution pixel. However, the associated low resolution pixel is generated at a grid line 64, since a portion of 'this last pixel is exposed. The previous four low resolution pixels underlie the high resolution image and, therefore, do not need to be generated or stored. Therefore, during the scan, the low resolution counter is off for four low resolution pixel counts and turned on for the last low resolution pixel count, which comprises the last two columns of high resolution pixels. However, the hardware is controlled such that for the first line, the high resolution pixels are output to the laser and the first portion of the second line of the last low resolution pixel initiated at the grid edge 64 is masked such that the information from the high resolution pixel is output. This will be described in more detail hereinbelow.

The high resolution counter need only be off for the last pixel in the second line and is then turned on again for twelve counts, it being remembered that this third line is still within the first line of low resolution pixels. At the end of the last high resolution pixel in the third line, the grid edge 64 is reached, such that the last line in the low resolution pixel at the end of that line shows through. Thereafter, the laser again wraps around and begins the fourth line of the grid with the high resolution counter turned on for 11 counts and then off for three counts. The 11 count ends at a grid edge 66 which overlaps into the third low resolution pixel in the second line of low resolution pixels. This requires only three of the low resolution pixels to be off (since they will not show through) and then the last two low resolution pixels in the second line being turned on. This continues as illustrated in Table 1. It can be seen that in the last line, the high resolution counter is on for only two counts, such that an entire line of the low resolution pixels is not covered up. This therefore requires the low resolution pixel counter to be on for the entire line of low resolution pixels.

Figure 5:
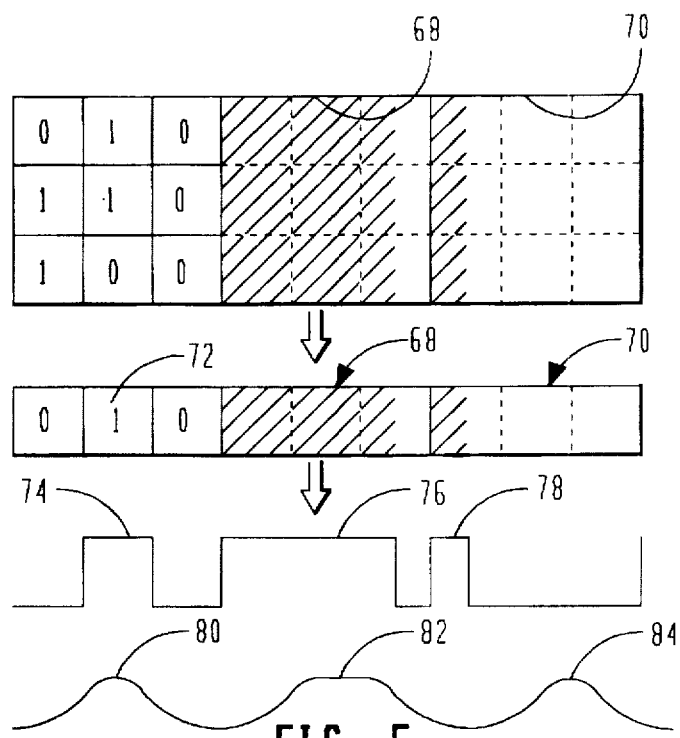
FIG. 5 illustrates a detail of the actual output to the layers in the output image space.

Referring now to FIG. 5, there is illustrated a diagrammatic view of two low resolution pixels 68 and 70 disposed adjacent to each other with nine high resolution pixels disposed adjacent thereto. The high resolution pixels are illustrated as having values of either "0" or "1". The value "1" indicates a pixel that is turned on to represent a "dot". The low resolution pixel 68 is illustrated as having a value that partially shades a pixel from the left to the right for a relatively high value for that pixel 68, and the low resolution pixel 70 is illustrated as having a small amount of shading to the left thereof, this representing a low value. The amount of time that the laser is turned on for each scan line in the low resolution pixel 68 is greater than two-thirds of the pixel, whereas the amount of time that the laser is turned on for each of the scan lines in the low resolution pixel 70 is less than one-third. This is represented by the shading. It can be seen that the shading is similar for each scan line in a given low resolution pixel, such that the low resolution pixel as a whole represents a partial shading. This, again, is a conventional technique. For illustrative purposes, only the first scan line is illustrated with both the logic signals output therefrom and the actual driving signal to the laser. It can be seen that of the three high resolution pixels, the center one, a high resolution pixel 72, is at a high value, this represented by a pulse 74 to the laser. At the edge of the low resolution pixel 68, the laser again is pulled high at the leading edge thereof for a predetermined duration of time, as represented by pulse 76 and then goes low again prior to the initial edge of the low resolution pixel 70. Similarly, the laser again goes high at the initial edge of the low resolution pixel 70, as represented by pulse 78, and then goes low a short duration thereafter. The value for a low resolution pixel 68 is approximately 210 and the value for the low resolution pixel 70 is approximately 60. The lower curve is a curve of the actual output energy to the laser which illustrates a narrow peak 80 associated with the pulse 74, a broad peak 82 associated with the pulse 76 and a narrow peak 84 associated with the pulse 78.

Figure 6:
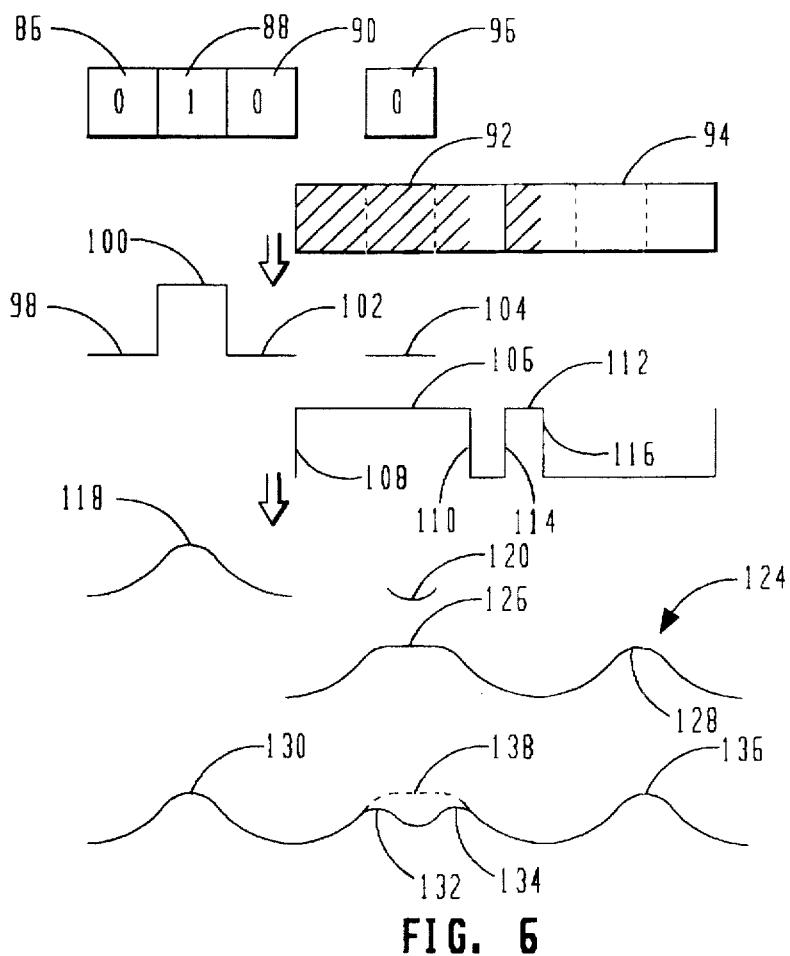
FIG. 6 illustrates an alternate configuration of FIG. 5 illustrating a high resolution pixel directly overlapping a low resolution pixel.

Referring now to FIG. 6, there is illustrated an alternate embodiment of FIG. 5, wherein there is a high resolution pixel disposed in the middle of a low resolution pixel. In this embodiment, when a single line is provided, three adjacent high resolution pixels 86, 88 and 90 are provided. They are disposed in image space adjacent to a line of a low resolution pixel 92, which low resolution pixel 92 is disposed adjacent a line of a low resolution pixel 94, it being noted above that each low resolution pixel at 200 DPI requires three lines of 600 DPI pixels. The information in the low resolution pixel 92 is identical to that in the low resolution pixel 68 and the information in the low resolution pixel 94 is similar to that in the low resolution pixel 70. In addition, however, there is provided a high resolution pixel 96 having a value of "0" that is disposed in the image space on the same line as the line of the low resolution pixel 92 illustrated in FIG. 6. Therefore, when the two images are mapped into the output image space, the high resolution pixel 96 will be inserted in the middle of the low resolution pixel 92 on the same line. The signal associated with the high resolution pixel is illustrated in the next step of combining wherein the high resolution pixel 86 is represented by a low signal 98, the high resolution pixel 88 is represented by a high signal 100, the high resolution pixel 90 is represented by a low signal 102 and the high resolution pixel 96 is represented by a low signal 104. Similarly, the low resolution pixel 92 for the associated line is represented by a high signal 106 and extends from an edge 108 to an edge 110, and the low resolution pixel 104 is represented by a high signal 112 that extends from an edge 114 to an edge 116. The signals 98–102 associated with the pixels 86–90 are represented by a waveform segment 118 that goes from a low to a high to a low, and the signal 104 associated with pixel 96 is represented by a waveform segment 120. The signals associated with the low resolution pixels 92 and 94 in their original image space are represented by a wave form segment 124 which will have a broad peak 126 associated with the high signal 106 and the low resolution pixel 92, and a narrow peak 128 associated with the high signal 112 and the low resolution pixel 94. However, it is noted that the waveform segment 120 representing a low signal is disposed in the middle of the broad peak 126. Therefore, the composite signal will then be represented by a first peak 130 representing the waveform segment 118, two peaks 132 and 134 representing the summation of the waveform segment 170 and the waveform segment 124 about the peak 126 and a peak 136 representing the peak 128. A dotted line 138 represents the composite signal if the waveform segment 120 associated with a high resolution pixel 96 were not present.

Figure 7:
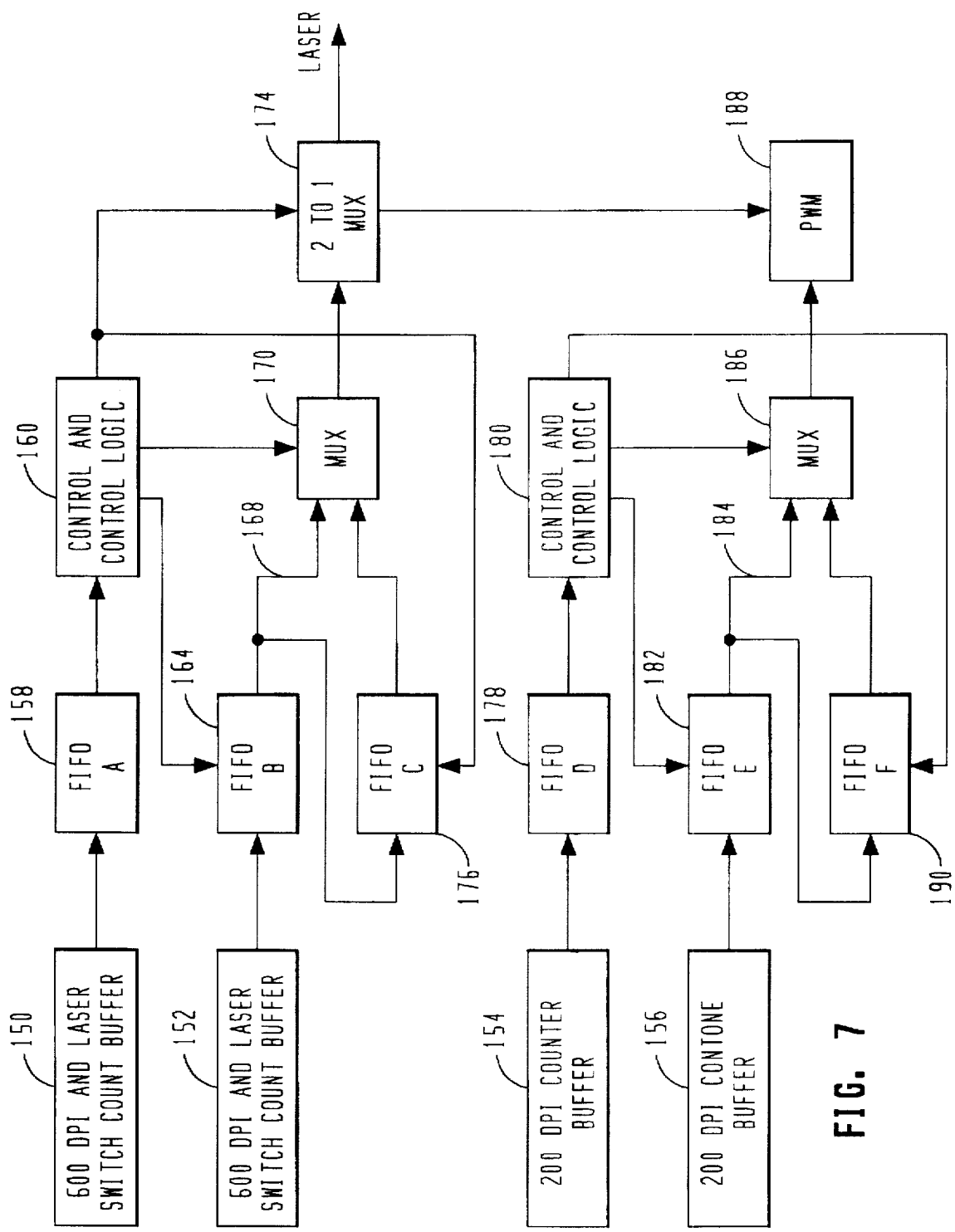
FIG. 7 illustrates a schematic block diagram of the system.

Referring now to FIG. 7, there is illustrated an overall block diagram of the bi-modal hardware and the CPU 12. The CPU 12 contains a 600 DPI laser switch count buffer for maintaining the switch count values at the generation thereof and a 600 DPI bi-level data buffer 152. Similarly, the low resolution images have associated therewith a 200 DPI counter buffer 154 and a 200 DPI Contone data buffer 156. The 600 DPI switch count buffer 150 is input to a FIFO 158 which is part of the bi-modal hardware 22 and the input thereof comprises one of the inputs to the bi-modal hardware 122. The FIFO A is operable to receive values and store the count values and then output them to a counter and control logic block 160 to generate the various count values for the 600 DPI portion of the system. The data stored in the 600 DPI bi-level buffer 152 is also transmitted along printer bus 14 to the bi-modal hardware 22 for input to a FIFO 164, which is operable to store the data therein. The data is read into the FIFO 164 at the rate it is output from the buffer 152 but the Read operation from the FIFO 164 on an output 168 is controlled by the counter and control logic block 160. As described above, this is only output when pixel data is to be mapped into the output image plane. This output 168 is input to an input multiplexer 170, the output thereof input to a two input multiplexer 174, the output thereof comprising the laser modulation signal. The multiplexer 170 is utilized in a line replication operation wherein a line of information to be replicated will be input to a FIFO 176 which has a length that is equal to at least the length of an entire line of pixels in the output image space. The output of FIFO 176 is input to the other input of the multiplexer 170.

For the low resolution 200 DPI Contone portion of the bi-modal hardware 22, the 200 DPI counter 154 provides at the output thereof a FIFO 178 which is operable to store the count values and then output them to a counter and control logic block 180. This is utilized to control the low resolution portion of the bi-modal hardware 122. The data for the Contone image that is stored in the 200 DPI Contone buffer 156 is output by the CPU 22 and then input to a FIFO 182, the output thereof controlled by the counter and control logic block 180 to perform a Read operation to an output 184 in accordance with the operation described hereinabove. This output is input to a two input multiplexer 186, the output thereof connected to a Pulse Width Modulation (PWM) block 188, the output thereof provided as a second input of multiplexer 174. The multiplexer 174 is controlled by a counter and control block 160, since the high resolution image in the preferred embodiment is always above the low resolution image in the output image space. Additionally, a FIFO 190 is provided for line replication wherein the input to the FIFO 190 is connected to the output line 184 such that, as information is output by the FIFO 182, it is stored in the FIFO 190. The multiplexer 186 then receives the input of the FIFO 190, FIFO 190 controlled by the counter and control logic block 180.

As described above, the FIFO 176 and the FIFO 190 are provided for line replication. Therefore, each of the FIFOs 176 and 190 must be of sufficient size to store information for an entire line. For a 600 DPI bi-level format, and for an 8½ page, the FIFO 176 must store 5100 bits of data or 638 bytes of information. Similarly, the FIFO 190 must store sufficient information for 1700 pixels, or it must store 1700 bytes of information.

The data in each of the FIFOs 174, 176, 182 and 190 is "fragmented." As such, the data only represents the portion of the high resolution or low resolution image that is to be mapped into the output image plane. Of course, all the data can be stored therein, and the FIFO's continually Read, the multiplexer 170 selecting only the one that is to be mapped into the output plane. However, by fragmenting the data and only storing the portion that is to be output to the image plane during the appropriate time by the multiplexer 174, significant savings in memory can be achieved and, further, the amount of information that must be transferred to the bimodal hardware 22 can be reduced. Therefore, whenever high resolution data is to be output, the multiplexer 174 selects the output of the multiplexer 170, and the multiplexer 170 selects the output of either FIFO 164 or FIFO 176. Whenever the Contone image is selected, the multiplexer 174 selects the output of the PWM 188 which is connected to the output of multiplexer 186, multiplexer 186 selecting the output of FIFO 182 or FIFO 190.

During the first line of information transfer of low resolution pixels, the 200 DPI contone buffer 156 at the CPU will generate and transfer the data for that line, which data is fragmented and stored in the FIFO 182. This will be output when that line is scanned by the laser and also it will be stored in the line replication FIFO 190 during the output by FIFO 182. Since three scans are required to scan a row of low resolution pixels, the next two lines or rows will be provided by the FIFO 190. As such, information is not required to be transferred down the bus 14 from the CPU 22 for each line of high resolution pixels when dealing with low resolution pixels. This again further increases throughput.

Figure 8:
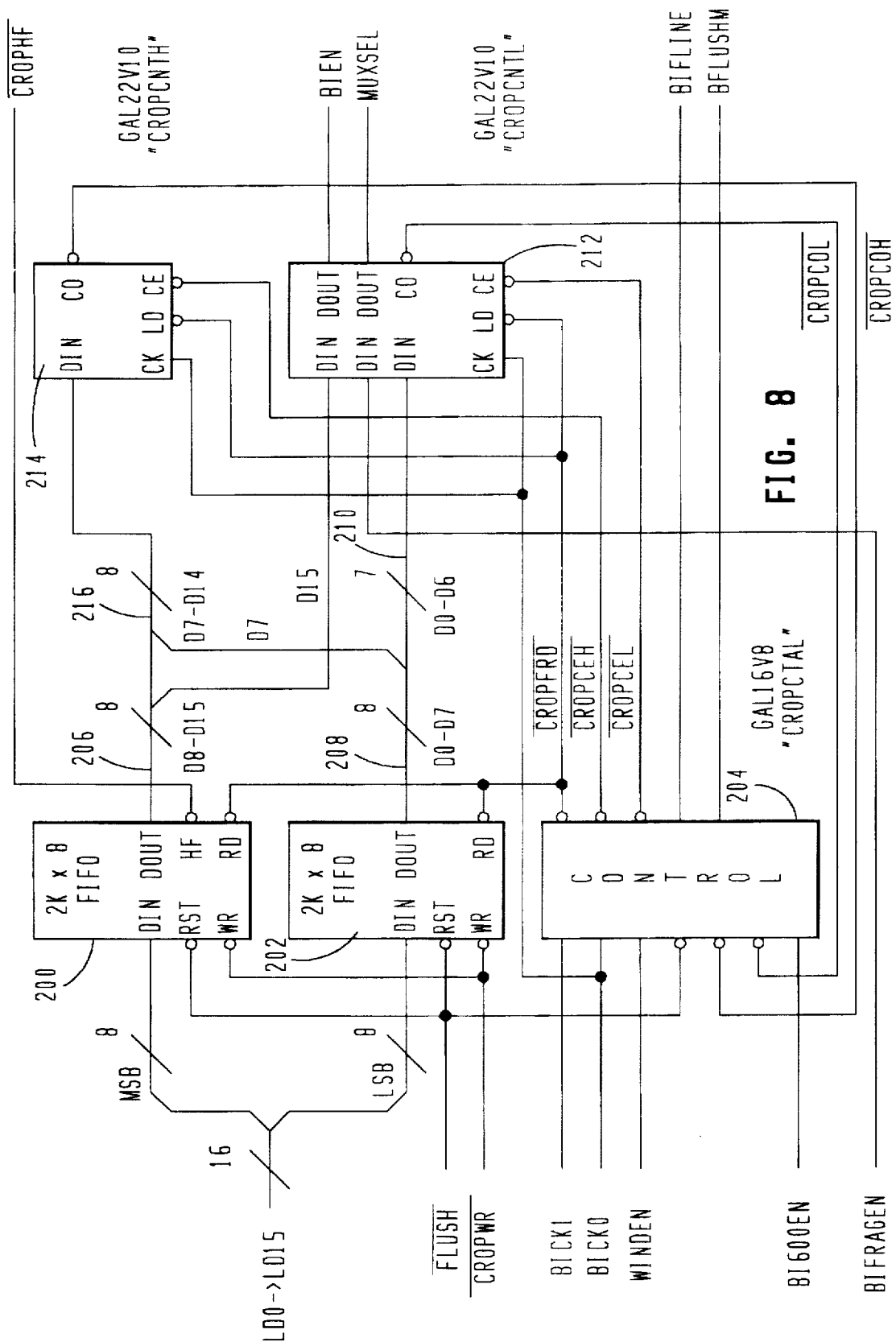
FIG. 8 illustrates a logic diagram of the pixel crop generator which is the counter and control block of FIG. 7.

Referring now to FIG. 8, there is illustrated a logic diagram of the FIFO 158 and control logic block 160 of FIG. 7. Two FIFOs 200 and 202 are provided with each comprising eight bits of 16-bit input data labelled LD0–LD15. Data input to the FIFO 200 comprises the MSB portion of the data and the data input to the FIFO 202 comprises the LSB portion of the data. The FIFOs 200 and 202 are controlled by a control block 204 which is a gate array logic device that generates read commands to output data from each of the FIFOs onto a data bus 206 and a data bus 208, respectively. The output from FIFO 200 is comprised of the data bits D8–D15 and the data on the data bus 208 comprises the data D0–D7. Seven bits of the data on data bus 208 are input to a data bus 210, constituting the data bits D0–D6. These are input to a gate array logic counter block 212. Additionally, the data bit line D15 from the data bus 206 is also input to the gate array logic block 212, in addition to an external signal, BIFRAGEN. The data bit D7 is input to a gate array logic counter block 214 on a bus 216, the data bits D8–D14 also input to the data bus 216 and to the input of the gate array logic block 214.

Gate array logic blocks 212 and 214 provide a 16-bit counter with the counter output of block 212 comprising the low portion of the count value and the counter output of the counter block 214 providing the high portion of the count operation. These outputs are input to the control block 204. The reset operation of both the control block 204 and both of the FIFOs 200 and 202 are controlled by a Flush signal, FLUSH-Bar and the write operations of the FIFOs 202 and 200 are controlled by a Write signal CROPWR-Bar. The control block 204 receives two clock signals BICK1 and BICK0, the clock BICK0 also input to the clock inputs of the gate array logic blocks 212 and 214. The control block 204 is operable to generate a Read signal, CROPFRD-Bar, which is input to the Read inputs of the two FIFOs 200 and 202 and is also input to the load inputs of the two counter blocks 212 and 214 to load the count value therein. The counters are enabled by two Enable signals, a signal CROPCEH-Bar for input to the block 214 and an Enable signal CROPCEL-Bar for input to the block 212. This initiates the count value. The gate array logic block is operable to output a Bi-Level Enable signal, BIEN, and a multiplexer signal, MUXSEL, the BIEN signal activating the generation of Bi-Level pixels and the MUXSEL signal controlling the multiplexer 174 to select the high resolution pixel output.

During operation, the control block 204 is enabled by a signal WINDEN and a signal B160ODN to control the FIFOs 200 and 202 to load the count value into the counter blocks 212 and 214. The control block 204 is operable to generate the various Flush signals BIFLINE and BFLUSHN (both to the data FIFOs). Additionally, the HF output of the FIFO 200 comprises a signal CROPHF-Bar.

Figure 9:
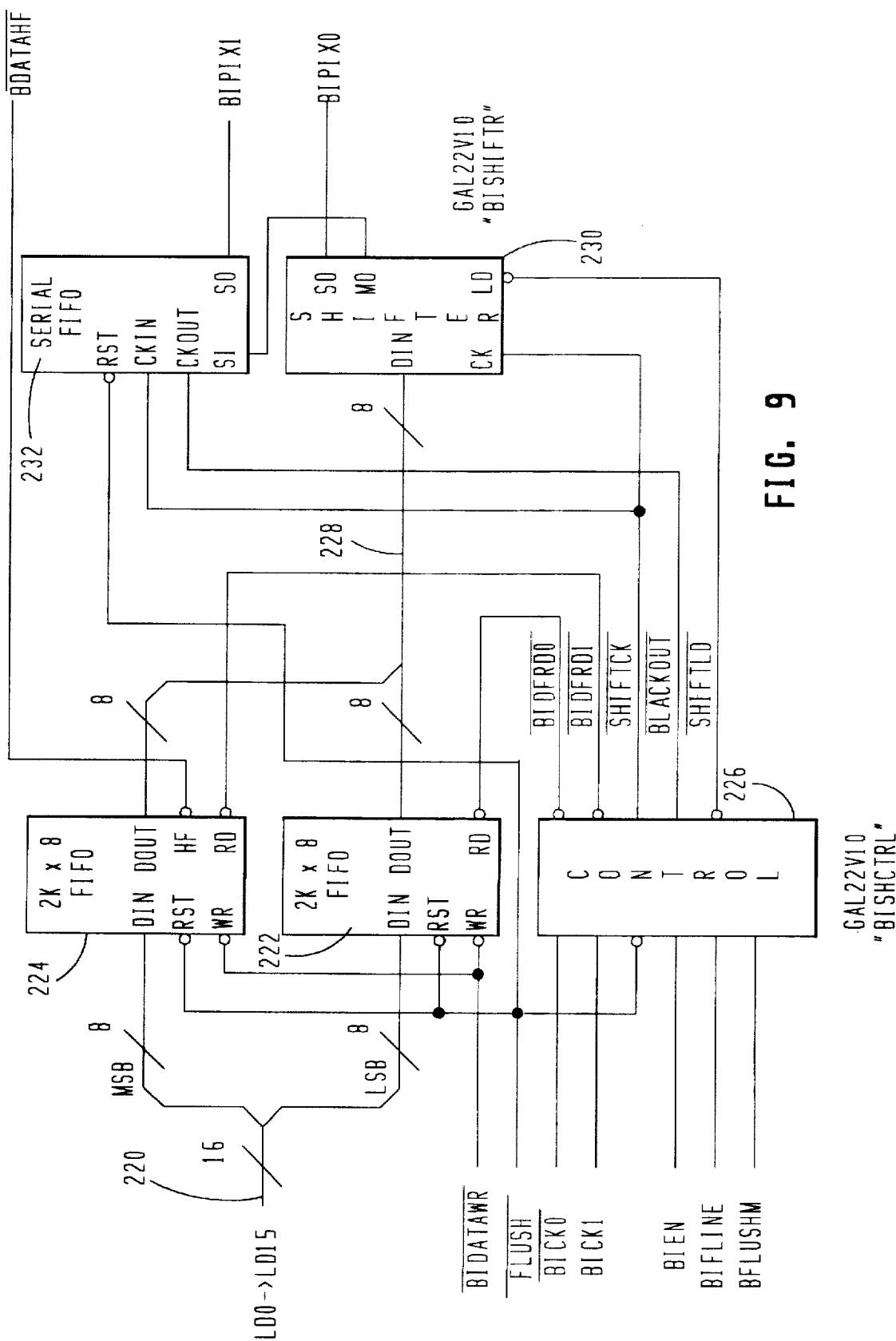
FIG. 9 illustrates a block diagram of the high resolution data FIFOs.

Referring now to FIG. 9, there is illustrated a logic diagram of the data FIFOs 164 and 176 of the multiplexer 170 operation. The data is input on a bus 220 with the LSB eight-bit portion input to a FIFO 222 and the MSB eight-bit portion input to a FIFO 224. The reset inputs of the FIFOs 222 and 224 are connected to the FLUSH-Bar signal and the Write inputs are connected to an external Write signal BIDATAWR-Bar. The FLUSH signal is also input to a control block 226, which is a gate array logic block. The FIFOs 224 and 222 comprise the first data FIFO 164 to provide a 4K×8 FIFO. The Read output of the FIFO 224 is connected to a Read control signal, BIDFRD1-Bar, output by the control block 224, and the Read input of the FIFO 222 connected to an output signal BIDFRD0-Bar from control block 226. Control block 226 receives clock inputs BICK0-Bar and BICK1.

The data output of FIFO 224 is multiplexed onto a data bus 228, as well as the output of the FIFO 222. By separately enabling the Read input thereof, the data can be separately input to the data bus 228. The data bus 228 is input to a shifter block 238, which is gate array logic block. This provides on the output thereof a serial output labelled BIPX0 and a secondary output labelled MO. The serial output BIPX0 is the primary output which comprises a serialized data stream, the shifter 230 operable to convert the parallel input word to a serial output, since this is a Bi-Level output signal comprising a stream of single bits. A serial FIFO 232 is provided having a serial input connected to the M0 output such that the serial data stream output from the shifter 230 as the output BIPX0 is stored in the serial FIFO 232. The serial FIFO 232 comprises the FIFO 176. The output of the serial FIFO 232 is an output BIPIX1, the outputs BIPIX0 and BIPIX1 being input to a multiplexer (not shown), this being multiplexer 170, the output thereof input to the multiplexer 174.

The control block 226 is operable to generate a shift clock signal SHEFTCK for input to the clock input of the shifter 230. The shifter 230 is loaded with parallel data on the bus 228 by a Load signal from the control block 226 labelled SHIFTLD-Bar. The clock input for the serial FIFO 232 is also the shift clock SHFTCK. This is the clock input CKIN. When the data is to be clocked out from the serial FIFO 232, it is controlled by a signal BLRCKOUT on the CKOUT input to the serial FIFO 232. The control block 226 is enabled by the BIEN signal and the BIFLINE signal. The BLRCKOUT signal replaces the SHIFTCK signal during a repeated line operation, the CKIN input being the signal that controls loading of data into the serial FIFO 232. Therefore, once loaded, the BLRCKOUT signal can control the serial FIFO 232 to continually output the same line.

Figure 10:
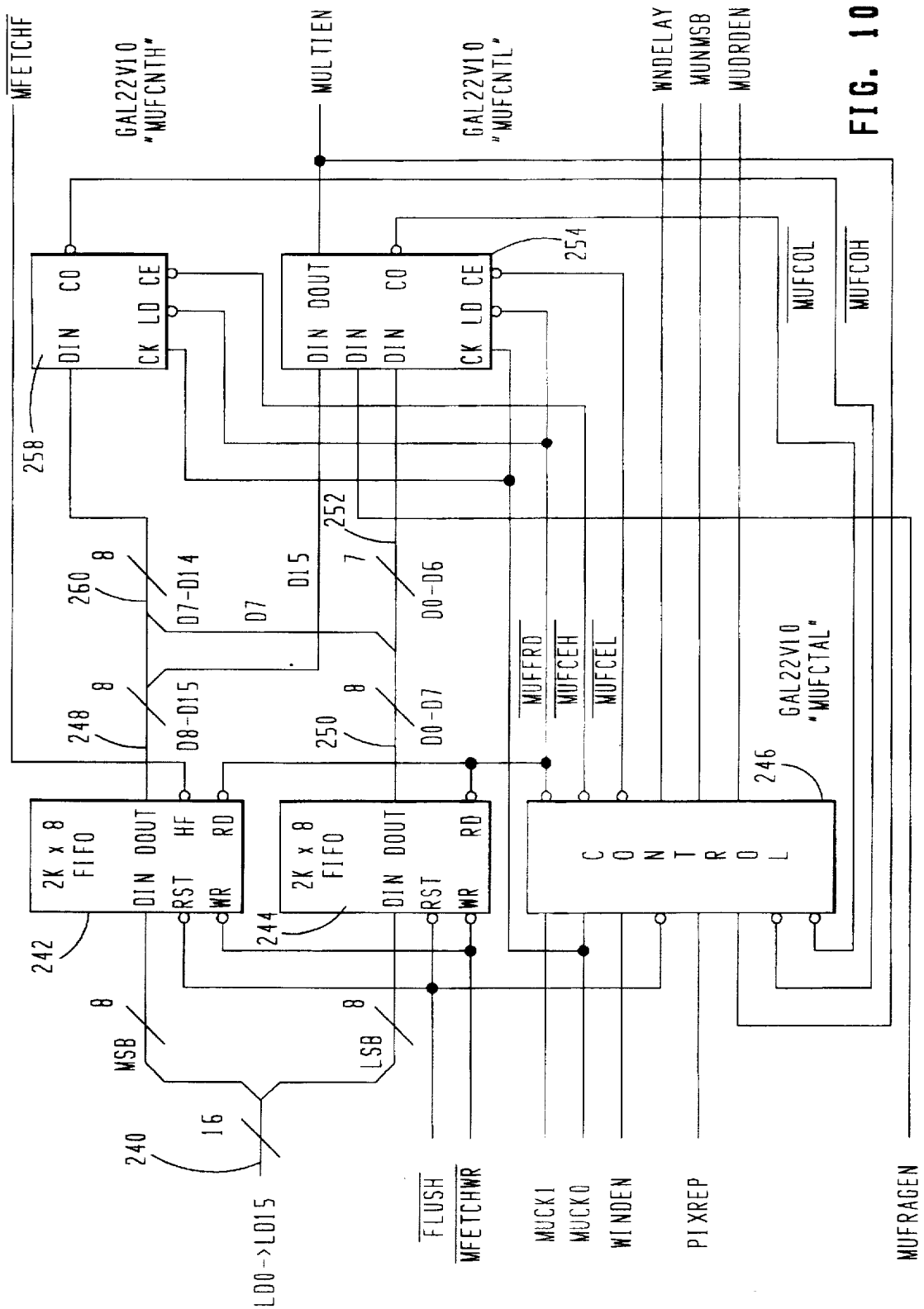
FIG. 10 illustrates a block diagram of the multiplexed controller which constitutes the low resolution counter and control block.

Referring now to FIG. 10, there is illustrated a block diagram of the control block and counter 180 and FIFO 178. Data is input on a 16-bit data bus 240, the eight MSD bits thereof input to a FIFO 242 and the eight LSB bits thereof input to a FIFO 244. A control block 246, implemented with a gate array logic device, generates a Read signal MUFFRD-Bar for controlling the Read operation thereof The output of FIFO 242 is output on an eight-bit data bus 248 and the output of FIFO 244 is output on an eight-bit data bus 250. The data associated with bus 250 are the data bits D0–D7, and data bits associated with the data bus 248 are the data bits D8–D15. The data bits D0–D6 are connected to a seven-bit data bus 252 and this is then input to a counter block 254, this implemented with a gate array logic device. Additionally, the D15 data bit from bus 248 is input to an input of the counter 254, as is an Enable signal MUFRAGEN.

The counter block is clocked by a clock signal MUCK0, this input to the control block 246. Additionally, the clock signal MUCK1 is input to the control block 246. The counter block 254 has the Load input thereof connected to the MUFFRD-Bar signal, this being the Read control signal for the FIFOs 242 and 244. Therefore, whenever the data stored in the FIFOs 242 and 244 is read, it is loaded into the counter block 254. The chip enable input to the counter block 254 is connected to a signal MUFCEL-Bar output from the control block 246. The counter block 254 is operable to output a Count signal MUFCOL-Bar to the control block 246. Additionally, the second part of the counter, a counter block 258 is provided for receiving on the input the data bits D7–D14 on the data bus 260, the data bits D8–D15 received from the data bus 248 and the data bits D7 received from the data bus 250. The clock input is connected to the MUCKO clock signal and the Load signal is connected to the MUFFRD-Bar signal. The Chip Enable signal is connected to a Chip Enable signal MUFCEH-Bar output by the control block 246. Therefore, data is loaded into the counter block 258 at the same time it is loaded into the counter block 254. However, the count operation is separately controlled.

The count output of the block 258 is connected to an input of the control block 246 as an input MUFCOH-Bar. In operation, the FLUSH-Bar signal is connected to the reset inputs of the control block 246 and the FIFOs 242 and 244. The Write input is connected to a Write signal MFETCHWR-Bar for both the FIFO 242 and the FIFO 244. The entire system is enabled by an Enable signal WINDEN, this also input to the control block 204 of FIG. 8. This is the main Enable signal. A pixel repetition signal PIXREP is also input to the control block 246 to control pixel repetition. The control block 246 is also operable to output a delay signal WNDELAY, an Enable signal MUDREN and a signal MUDMSB. One of the outputs from the counter block 254 is the low resolution enable signal MULTIEN, which is also input to the control block 246. This enables the output of pixels from the low resolution portion of the system.

Figure 11:
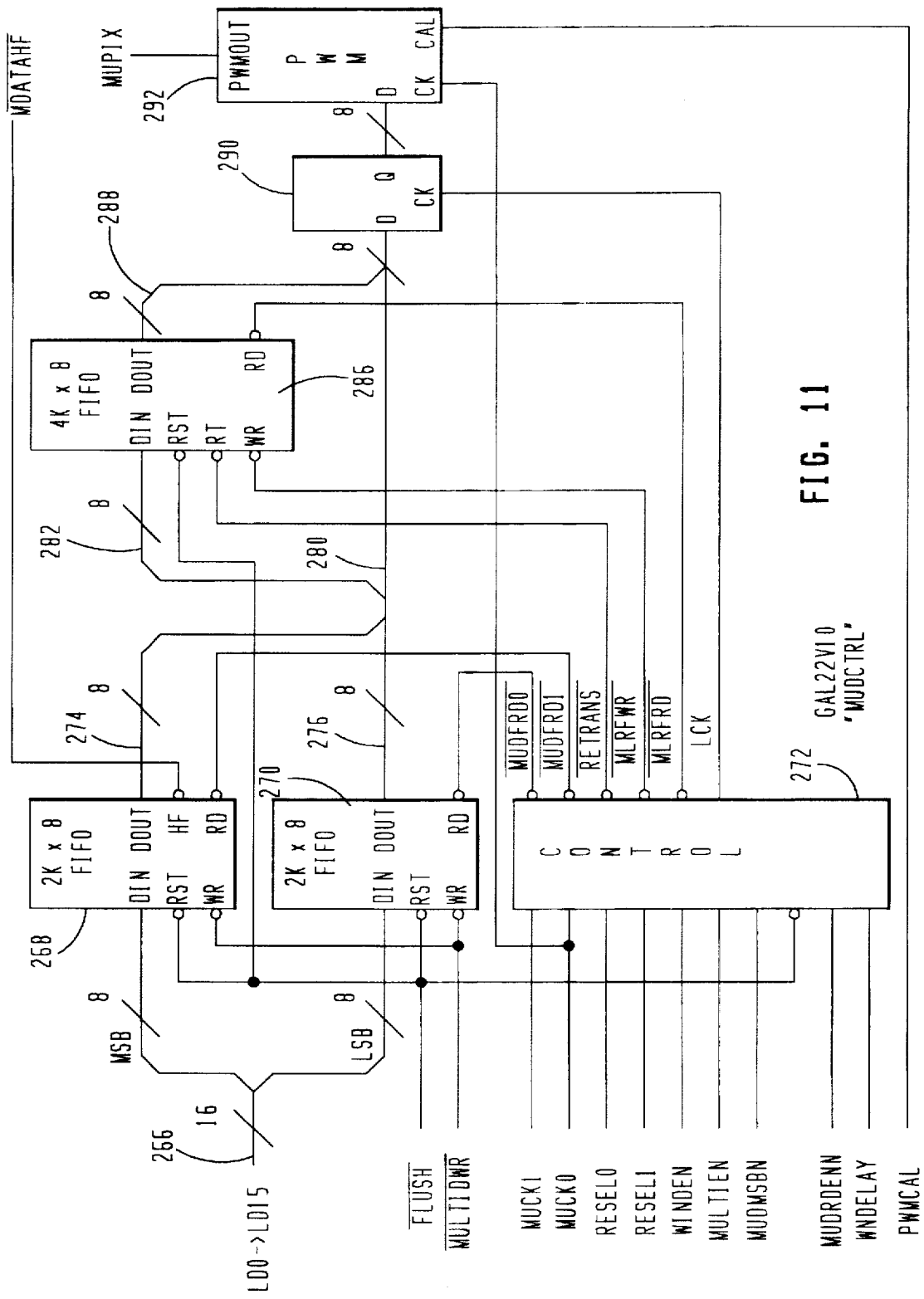
FIG. 11 illustrates a logic block diagram of the low resolution data FIFO.

Referring now to FIG. 11, there is illustrated a logic block diagram of the FIFOs 182 and 190. Pixel data is received on a 16 bit bus 266, the eight MSB bits input to a FIFO 268 and the eight LSB bits input to a FIFO 270. The Read operations of the FIFOs 268 and 270 are controlled by Read signals MUDFRD1-Bar and MUDFRD0-Bar, respectively, output from the control block 272. The output of FIFO 268 is output on an eight-bit bus 274 and the output of FIFO 270 is output on an input data bus 276. Both data buses 274 and 276 are connected to an eight-bit data bus 280 and also to an eight-bit bus 282, bus 282 input to a FIFO 286. FIFOs 268 and 270 comprise the FIFO 182, and the FIFO 286 comprises the FIFO 190 in FIG. 7.

The output of FIFO 286 is provided on an eight-bit data bus 288, both buses 288 and 280 input to a D-type flipflop 290. The flipflop 290 is clocked by signal LCK from the control block 272. FIFO 286 has the Read operation thereof controlled by a signal MLRFRD-Bar from control block 272 and the Write operation thereof controlled by a signal MLRFRD-Bar from control block 272. Additionally, a transmit input RT on FIFO 286 is connected to a signal RETRANS-Bar from control block 272. The reset inputs of FIFO 286, FIFO 268, FIFO 270 and block 272 are connected to the FLUSH-Bar signals.

The output of flipflop 290 is connected to the input of a Pulse Width Modulation (PWM) block 292, this receiving a parallel input and then operable to output a multiplexer output MUPIX which is input to the multiplexer 174 of FIG. 7. This PWM block 292 is clocked by the clock signal MUCKO which is one clock input to the control block 272, the other clock input being the clock input MUCK1. A PWMCAL signal is provided external to the system to provide a calibration input to the PWM block 292.

The control block 272 is operable to receive the two clock inputs MUCK1 and MUCK0 and also two select signals RESEL0 and RESEL1. Additionally, the main Enable signal WIDEN is input to the control block 272 in addition to the low resolution pixel Enable signal MULTIEN.

Figure 12:
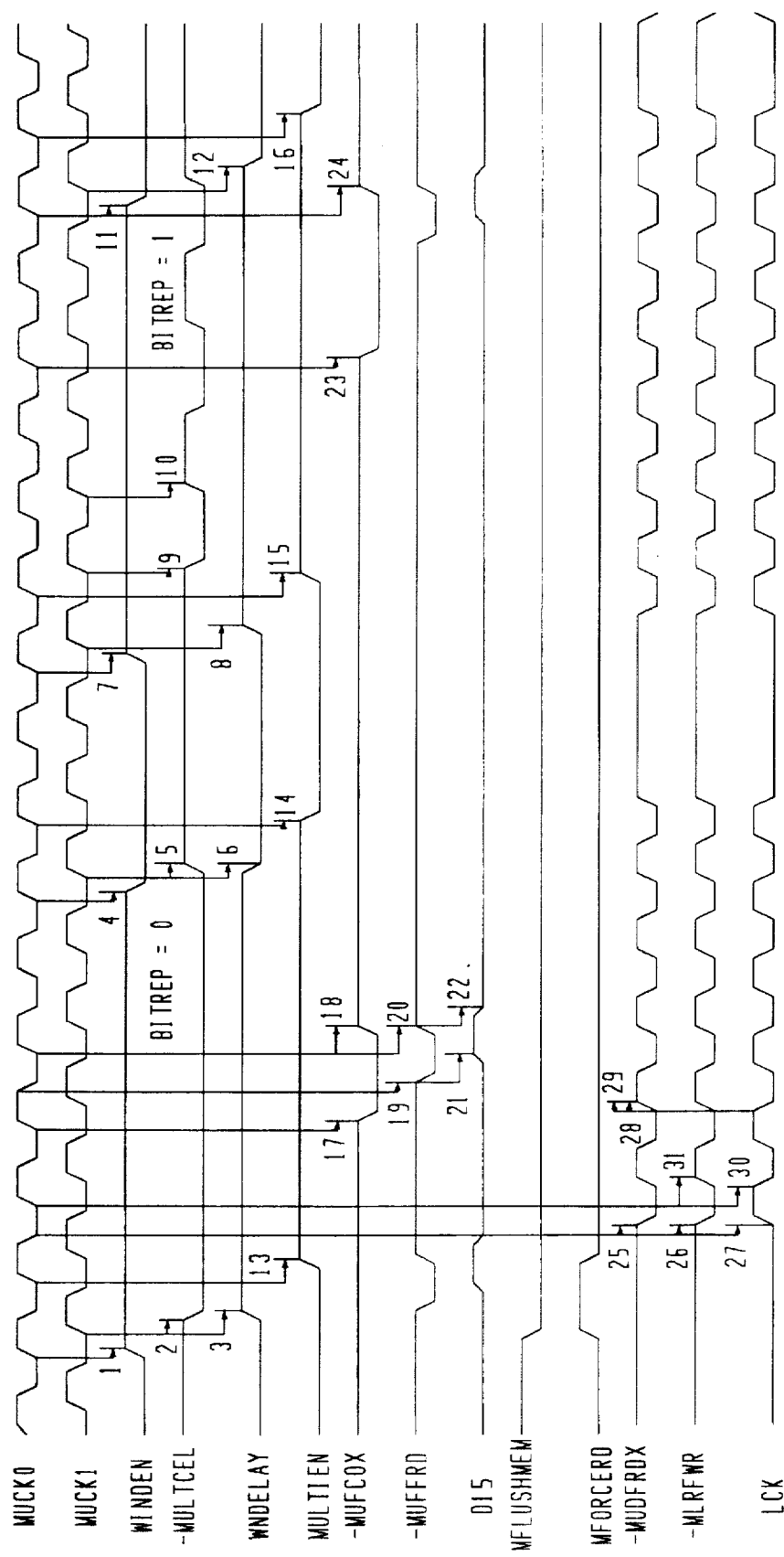
FIG. 12 illustrates a timing diagram for the low resolution control operation.

Referring now to FIG. 12, there is illustrated a timing diagram illustrating the basic control operations for the low resolution control/counter operation illustrated in FIG. 10. The WIDEN signal is illustrated for two lines, it going high for each line. During the WIDEN window, the low resolution pixel is turned on at all times in this illustration. It can therefore be seen that the enable signal MULDIEN is turned on for the entire duration of the line. The Read operation of the count value of FIFOs 242 and 244 is loaded when the signal MUFFRD goes low, this occurring at the beginning of the WIDEN window. This will result in the clock signal LCK occurring during the entire time the WIDEN signal is high, thus shifting data out from the D-flipflop 290 to the PWM block 292. It can be seen that the signal MLRFWR is generated such that the FIFO 286 is continually written to, but it is not read from. MUDFRD1-MUDFRD0-Bar signals are continually generated to read new pixel information from FIFOs 268 and 270 for both lines illustrated in the timing diagram of FIG. 12.

Figure 13:
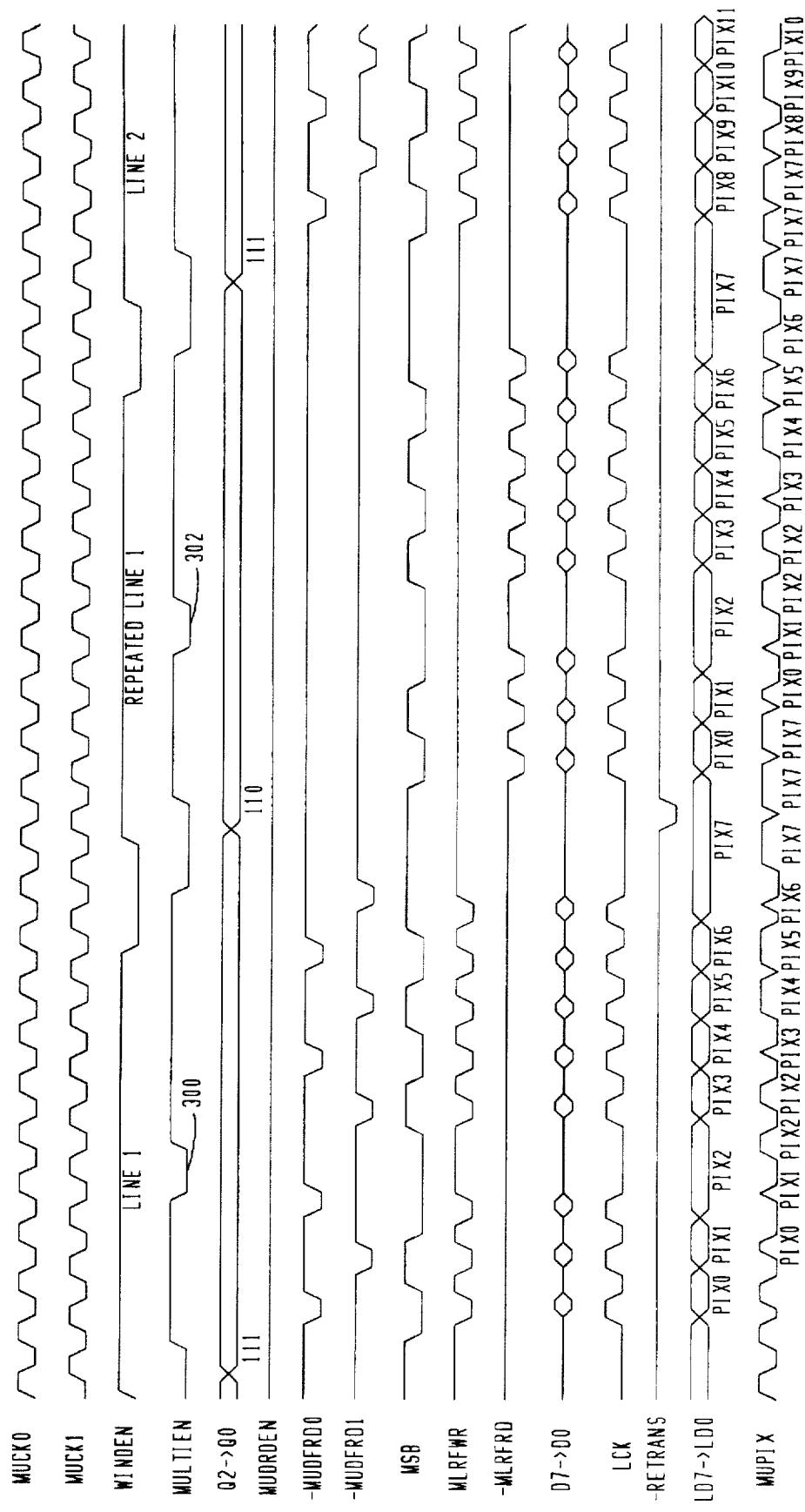
FIG. 13 illustrates a timing diagram for the sequencing of the low resolution fragmented data for 300 DPI data.

Referring now to FIG. 13, there is illustrated a timing diagram for the control sequencing operation for the low resolution pixels and logic diagrams of FIGS. 10 and 11. This illustration provides three lines, a first line followed by a repeated line followed by a second line. In the first line, only a portion of the line is occupied by low resolution pixels, i.e., fragmented data. Therefore, the signal MULTIEM goes low at a point 300. Similarly, during the repeated line, a similar low transition 302 occurs. At the end of the first line, the RETRANS signal goes low, such that the operation is shifted to the FIFO 286. During the repeated line, the MUDFRD0-MUDDFRD1-Bar signals are not active, such that new data is not read from FIFOs 268 and 270. The MLRFRD-Bar signal is activated to read the previous line from FIFO 286, which line was written therein during the first line. The data in the MUPIX multiplexer output signal is illustrated as 300 DPI data.

Figure 14:
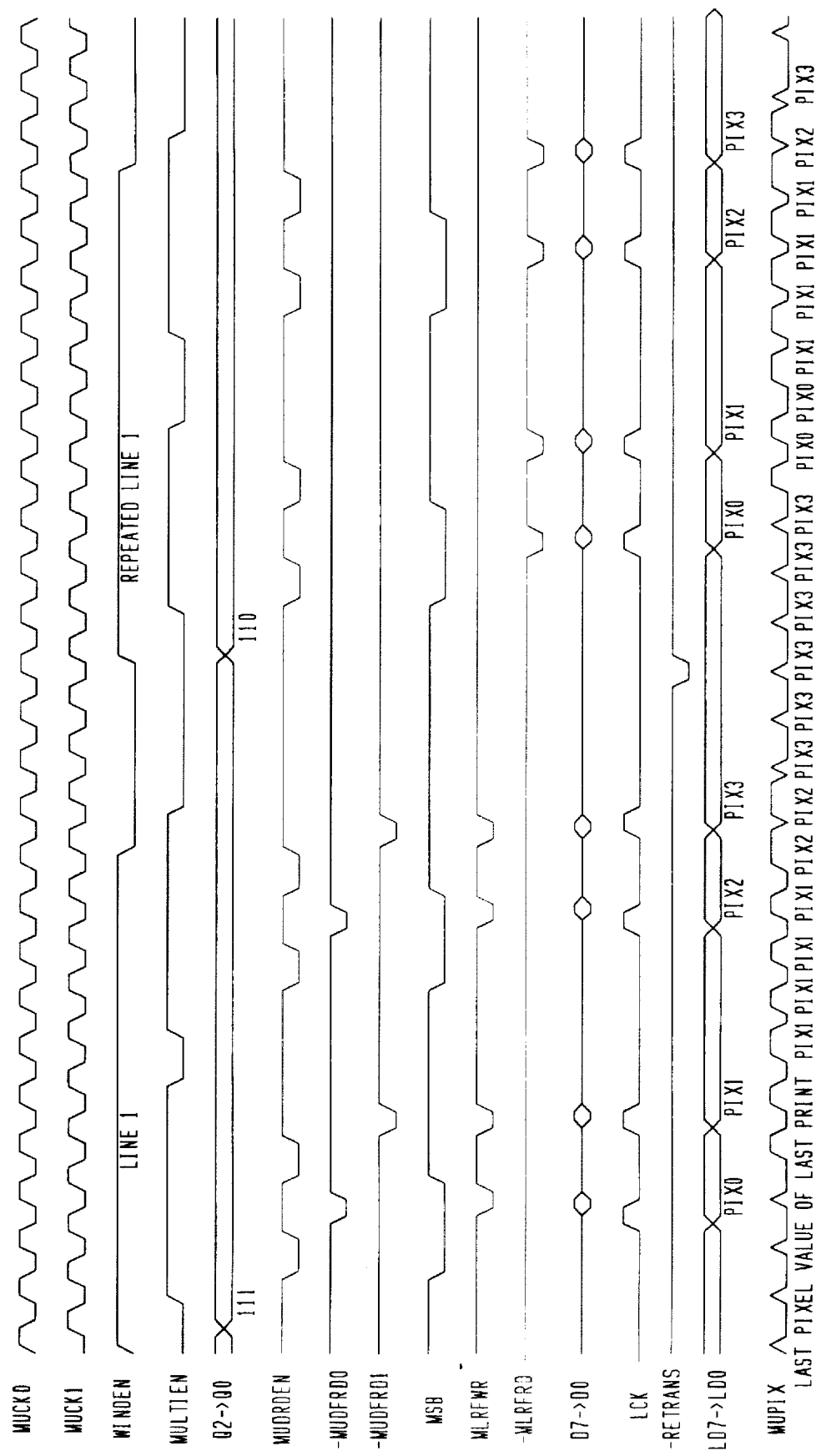
FIG. 14 illustrates the multilevel data fetch control sequencing with 150 DPI data.

Referring now to FIG. 14, there is illustrated a timing diagram for the low resolution data wherein pixels are replicated. This is controlled by loading the data with the MUDFRD1-Bar and MUDFRD0-Bar signals and then loading them on the Q-output of the flipflop 290 with the LCK signal. However, the LCK signal is then held low such that the PWM block 292 is then clocked in the MUCKO signal to continually output the same pixel. This is an option wherein if two or more pixels are adjacent each other, it is only necessary to send the information down the bus to the marking engine 10 a single time. This operation is controlled by the MUDRDEN enable signal.

Figure 15:
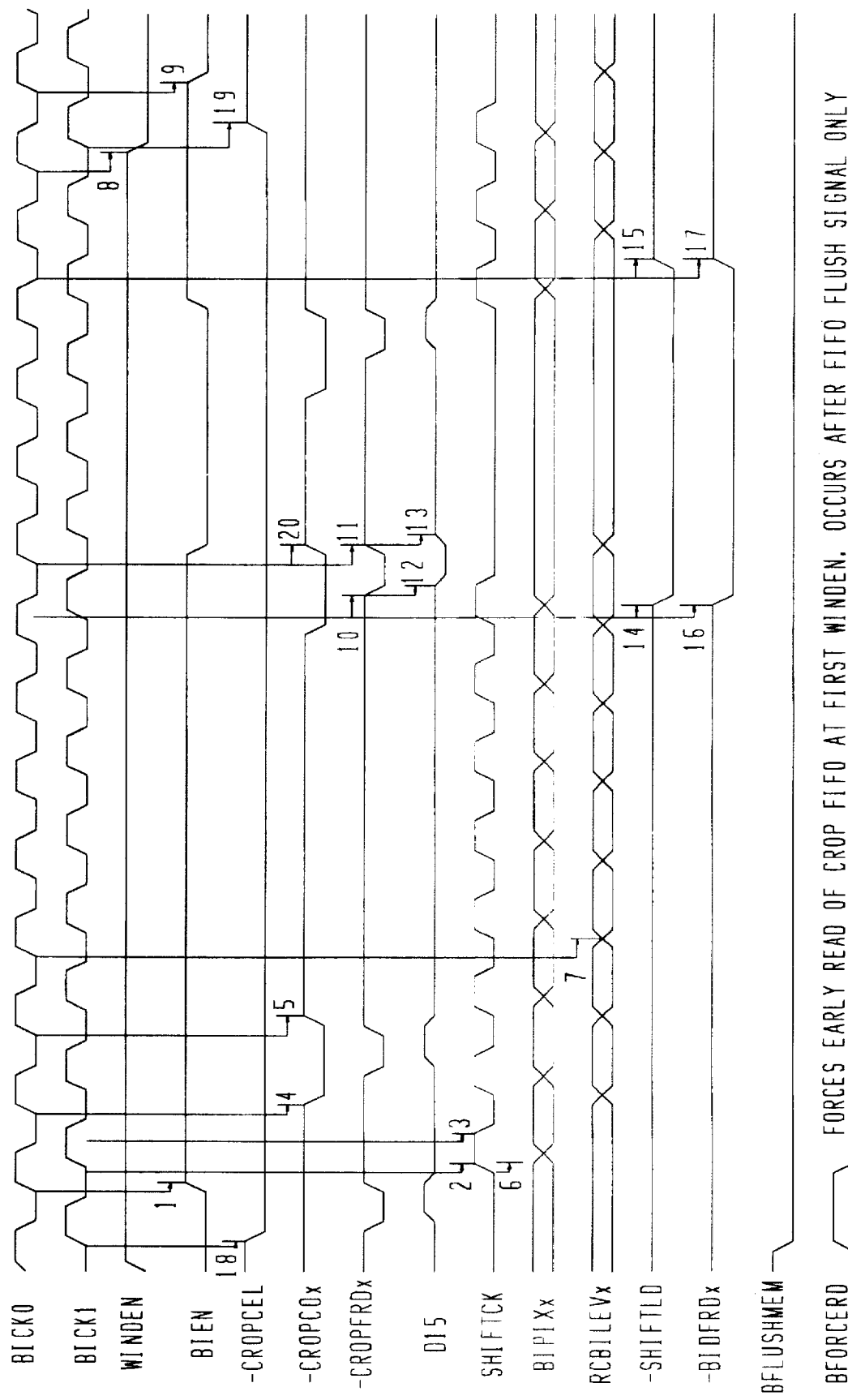
FIG. 15 illustrates the pixel crop control in the bi-level data shifter timing dependency.

Referring now to FIG. 15, there is illustrated a timing diagram for the high resolution control/counter circuit and pixel generation circuit of FIGS. 8 and 9. This is illustrated for a single line with fragmented data. It can be seen that the enable signal BIEN only goes high for a portion of the line and, during this time, the shift clock signal SHIFTCK signal is generated shifting data out of the shifter 230 or serial FIFO 232. During this time, the load input to the shifter block 230 is activated. Initially, the CROPFRD-Bar signal reads out the count value which is then loaded into the counter clocks 212 and 214.

Figure 16:
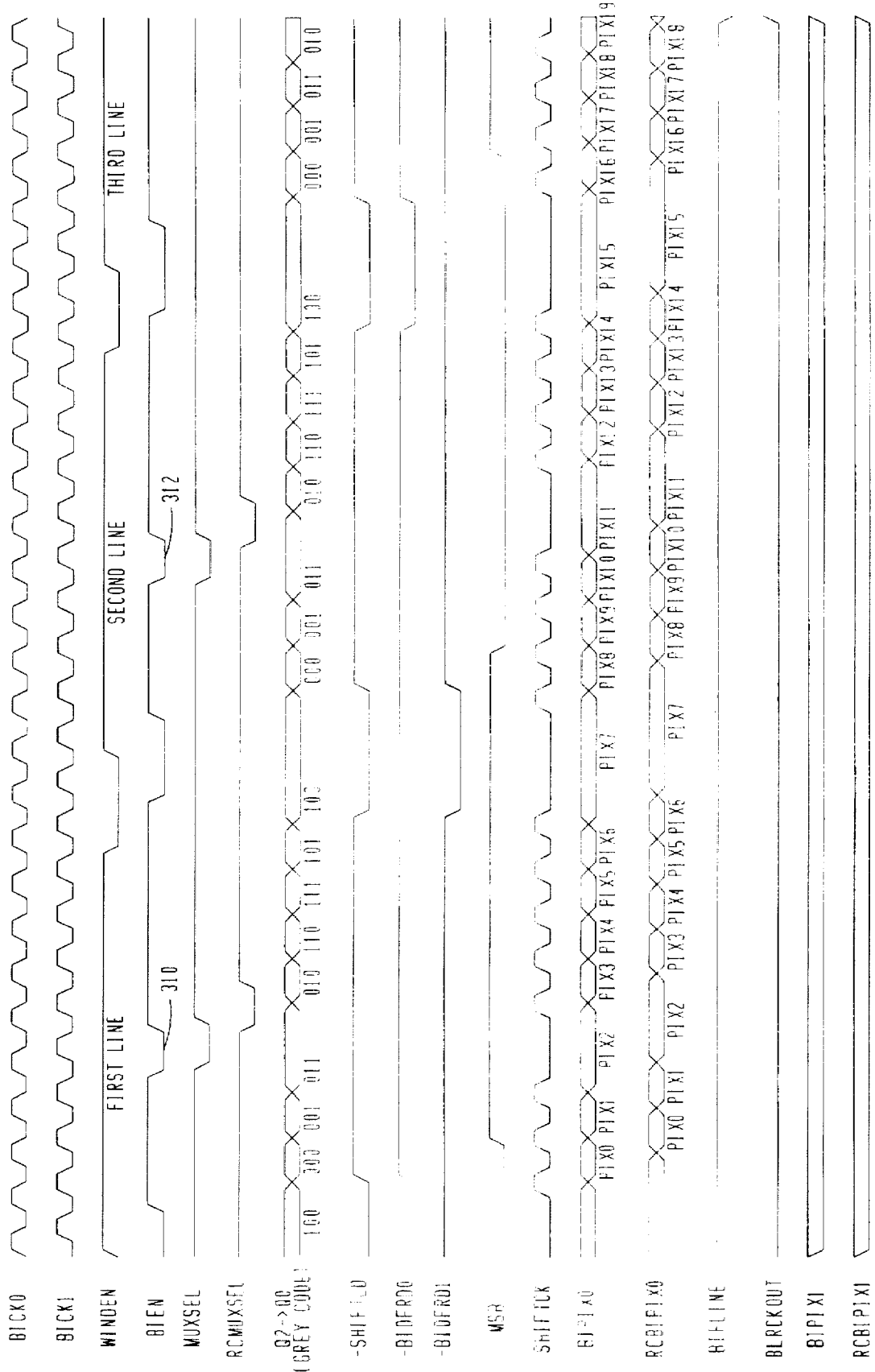
FIG. 16 illustrates a timing diagram for the bi-level shifter control sequencing for a 600 DPI fragmented data.

Referring now to FIG. 16, there is illustrated an alternate timing diagram showing the high level shifter control sequencing operation with a 600 DPI fragmented data pixel stream. This illustrates three lines which are fragmented. As such, the BIEN signal goes low during the first line at point 310, and low at a point 312 on the second line. The MUXSEL signal also goes low during these times to select the low resolution pixels. The shifter is loaded when the BIEN signal goes high, with the first FIFO 222 being read during the initial line, the second FIFO 224 being read during the second line and the FIFO 222 being read during the third line. The SHIFTCK signal is only generated when BIEN is high, such that the pixels are shifted out only during that time.

Figure 17:
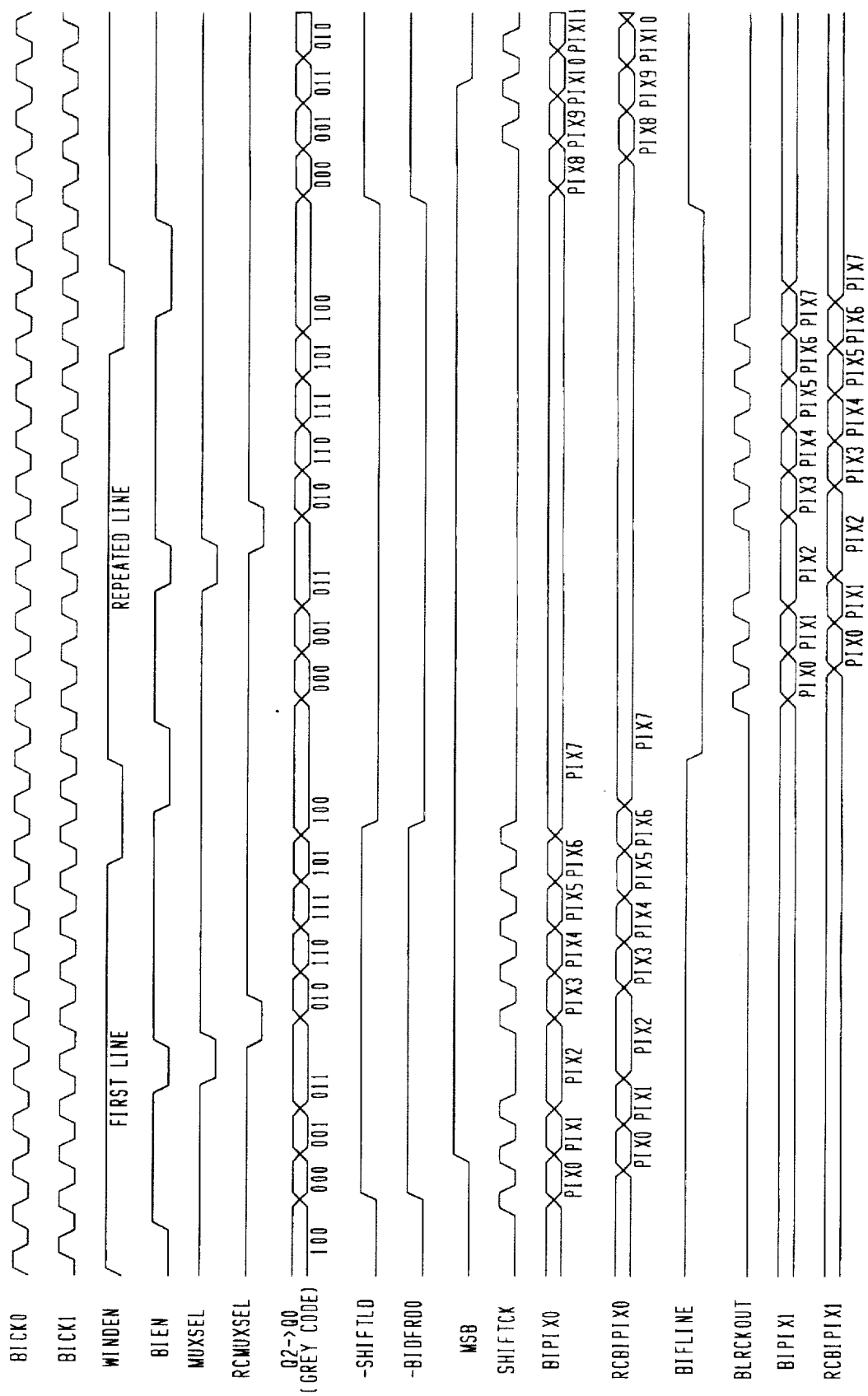
FIG. 17 illustrates a timing diagram.

Referring now to FIG. 17, there is illustrated an alternate embodiment of the timing diagram of FIG. 16 with a 300 DPI bi-level signal with a repeated line. When a line is repeated, the serial FIFO 232 has the output thereof clocked out with a signal BLRCKOUT. During this time, the SHIFTCK signal is inhibited. In the first line, the serial FIFO 232 is loaded by generating the SHIFTCK signal. It will remain loaded until the SHIFTCK signal is again generated. On the first line, the output BIPIX0 has the pixel information associated therewith and, on the second line, the output BIPIX1 line provides the output. The repeat operation is controlled by the external signal BIFLINE.

In summary, there has been provided a method and apparatus for controlling the operation of mapping a high resolution image and a low resolution image into an output image plane. The mapping is effected such that the high resolution image defines the edge or boundary between the two images when mapped into the output image plane. During the mapping operation, only the data associated with the portion of the image in the output image plane is stored and transferred to an electrophotographic print engine. The electrophotographic print engine then determines which pixels are to be sent to the associated marking engine, with an arbitrator is operable to select information from the image that is to be mapped into the output image.

Although the preferred embodiment has been described in detail, it should be understood that various changes, substitutions and alterations can be made therein without departing from the spirit and scope of the invention as defined by the appended claims.

What is claimed is:

1. A system for mapping images to an output image space in a marking engine, comprising:

a first mapping system for mapping a first portion of a first input image space having a first pixel format with a first bit depth and a first resolution into a first portion of the output image space;

a second system capable of mapping a second portion of a second input image space having a second pixel format and a second bit depth different from said second bit depth and a second resolution into a second portion of the output image space; and said first and second portions of said first and second image spaces at least partially overlapping in said output image space in an overlapping region, with the overlapping portion of said first image space being above said corresponding overlapping portion of said first image space in said output image space such that the edge resolution of said first portion at the boundary of said overlapping region is defined over the edge resolution of said second portion and wherein the portion of said second image space overlapping said image space is not mapped into said output image space by said second system for mapping.

2. The system of claim 1 wherein said first resolution is higher than said second resolution.

3. The system of claim 2 wherein the edge of said overlapping portion of said first image space adjacent said overlapping portion of said second image space in said output image space is defined by said first resolution.

4. The system of claim 1 wherein said first and second image spaces are defined by first and second pixel data, respectively, for all pixels in said respective first and second image spaces.

5. The system of claim 4 wherein said first and second pixel data is generated by a central processing unit (CPU) and stored in a CPU memory and said first mapping system is operable to only transmit from said CPU memory to said output image space said first pixel data associated with said first portion of said first memory space and said second mapping system is operable to transmit from said CPU memory to said output image space said second pixel data associated with the non-overlapping portion of said second portion of said second image space.

6. The system of claim 5 wherein said first resolution is higher than said second resolution.

7. The system of claim 5 wherein said first and second memory mapping system comprises:

a first pixel fragmenter for selecting from said CPU memory said first pixel data constituting said first portion of said first memory space;

a second pixel fragmenter for selecting from said CPU memory said second pixels constituting a non-overlapping portion of said second portion of said second image space; and an assembler for assembling said output image space with said selected ones of said first and second pixels selected by said first and second pixel fragmenters, respectively.

8. The system of claim 7 wherein said assembler is operable to assemble each of the lines of pixels in said output image space with said selected first and second pixels.

9. The system of claim 7 wherein said first and second pixel fragmenters are disposed at said CPU and said assembler is disposed at the marking engine and further comprising a data bus for transferring said selected first and second pixels to said assembler.

10. The system of claim 9 wherein said assembler comprises:

a first memory for storing said selected first pixels;

a first pixel generator for outputting said stored selected first pixels;

a second memory for storing said selected second pixels;

a second pixel generator for outputting said stored selected second pixels;

a multiplexer for selecting between the output of said first pixel generator and said second pixel generator; and a controller for controlling the operation of said first and second pixel generators to sequentially select the respective stored first and second pixels to assemble each line of said output image space and control said multiplexer to select the generated one of said first and second pixels at the appropriate time in accordance with signals received from said CPU.

11. The system of claim 10 wherein said first resolution is higher than said second resolution.

12. The system of claim 11 wherein said first pixel format is a bi-level pixel format and said second pixel format is a contone pixel format.

13. The system of claim 1, wherein said first bit depth is less than said second bit depth.

14. The system of claim 13, wherein said first pixel format is a bi-level pixel format and said second pixel format is a contone pixel format.

* * * * *